(12) United States Patent
Benjamin et al.

(10) Patent No.: US 12,014,307 B2
(45) Date of Patent: Jun. 18, 2024

(54) GENERATING VIABLE BUILDING DESIGNS FOR COMPLEX SITES

(71) Applicant: AUTODESK, INC., San Francisco, CA (US)

(72) Inventors: David Benjamin, Brooklyn, NY (US); Damon Lau, New York, NY (US); James Stoddart, Atlanta, GA (US); Lorenzo Villaggi, Brooklyn, NY (US); Rui Wang, New York, NY (US); Lindsey Wikstrom, West New York, NJ (US)

(73) Assignee: AUTODESK, INC., San Francisco, CA (US)

( * ) Notice: Subject to any disclaimer, the term of this patent is extended or adjusted under 35 U.S.C. 154(b) by 99 days.

(21) Appl. No.: 17/098,291

(22) Filed: Nov. 13, 2020

(65) Prior Publication Data
US 2021/0150091 A1    May 20, 2021

Related U.S. Application Data

(60) Provisional application No. 62/937,190, filed on Nov. 18, 2019.

(51) Int. Cl.
*G06Q 10/0639* (2023.01)
*G06F 16/901* (2019.01)
(Continued)

(52) U.S. Cl.
CPC ... *G06Q 10/06393* (2013.01); *G06F 16/9024* (2019.01); *G06F 30/13* (2020.01);
(Continued)

(58) Field of Classification Search
CPC .......... G06Q 10/06393; G06Q 10/047; G06Q 10/0633; G06Q 10/06375;
(Continued)

(56) References Cited

U.S. PATENT DOCUMENTS 8,005,656 B1    8/2011  Ankory et al.
8,229,176 B2    7/2012  Seegers et al.
(Continued)

FOREIGN PATENT DOCUMENTS

KR    2015-0125457 A    11/2015

OTHER PUBLICATIONS

Arash Bahrehmand, Thomas Batard, Ricardo Marques, Alun Evans, Josep Blat, Optimizing layout using spatial quality metrics and user preferences, Graphical Models, vol. 93, 2017, pp. 25-38, ISSN 1524-0703, https://doi.org/10.1016/j.gmod.2017.08.003. (Year: 2017).*
(Continued)

*Primary Examiner* — Brian S Cook
(74) *Attorney, Agent, or Firm* — Artegis Law Group, LLP

(57) ABSTRACT

A computer-implemented method for generating a building design for a building site having a complex shape comprises: generating a first group of processing areas from a plurality of processing areas associated with the building design and a second group of processing areas from the plurality of processing areas; generating a first building footprint leg that is sized to include the first group of processing areas and a second building footprint leg that is sized to include the second group of processing areas; at a pivot location, joining the first building footprint leg and the second building footprint leg at an aperture angle; performing a numerical simulation to position the first group of processing areas in the first building footprint leg and the second group of processing areas in the second building footprint leg to generate a candidate building design for the building site; and rendering the candidate building design.

20 Claims, 10 Drawing Sheets

(51) Int. Cl.
| | |
|---|---|
| *G06F 30/13* | (2020.01) |
| *G06F 30/18* | (2020.01) |
| *G06F 30/20* | (2020.01) |
| *G06F 30/28* | (2020.01) |
| *G06Q 10/047* | (2023.01) |
| *G06Q 10/0633* | (2023.01) |
| *G06Q 10/0637* | (2023.01) |
| *G06Q 10/067* | (2023.01) |
| *G06Q 10/101* | (2023.01) |
| *G06Q 50/08* | (2012.01) |
| *G06Q 50/16* | (2012.01) |
| *G06Q 50/163* | (2024.01) |
| *G06F 111/02* | (2020.01) |
| *G06F 111/04* | (2020.01) |
| *G06F 111/10* | (2020.01) |
| *G06F 119/02* | (2020.01) |
| *G06T 17/20* | (2006.01) |

(52) U.S. Cl.
CPC .............. *G06F 30/18* (2020.01); *G06F 30/20* (2020.01); *G06F 30/28* (2020.01); *G06Q 10/047* (2013.01); *G06Q 10/0633* (2013.01); *G06Q 10/06375* (2013.01); *G06Q 10/06395* (2013.01); *G06Q 10/067* (2013.01); *G06Q 10/101* (2013.01); *G06Q 50/08* (2013.01); *G06Q 50/163* (2013.01); *G06Q 50/165* (2013.01); *G06F 2111/02* (2020.01); *G06F 2111/04* (2020.01); *G06F 2111/10* (2020.01); *G06F 2119/02* (2020.01); *G06T 17/20* (2013.01)

(58) Field of Classification Search
CPC ........... G06Q 10/06395; G06Q 10/067; G06Q 10/101; G06Q 50/08; G06Q 50/163; G06Q 50/165; G06F 16/9024; G06F 30/13; G06F 30/18; G06F 30/20; G06F 30/28; G06F 2111/02; G06F 2111/04; G06F 2111/10; G06F 2119/02; G06F 30/12; G06F 2111/00; G06F 2111/06; G06F 2111/08; G06F 2111/12; G06F 2111/14; G06F 2111/16; G06F 2111/18; G06F 2111/20; G06F 2113/00; G06F 2113/02; G06F 2113/04; G06F 2113/06; G06F 2113/08; G06F 2113/10; G06F 2113/12; G06F 2113/14; G06F 2113/16; G06F 2113/18; G06F 2113/20; G06F 2113/22; G06F 2113/24; G06F 2113/26; G06F 2113/28; G06F 2115/00; G06F 2115/02; G06F 2115/04; G06F 2115/06; G06F 2115/08; G06F 2115/10; G06F 2115/12; G06F 2117/00; G06F 2117/02; G06F 2117/04; G06F 2117/06; G06F 2117/08; G06F 2117/10; G06F 2117/12; G06F 2119/00; G06F 2119/04; G06F 2119/06; G06F 2119/08; G06F 2119/10; G06F 2119/12; G06F 2119/14; G06F 2119/16; G06F 2119/18; G06F 2119/20; G06F 2119/22; G06F 30/25; G06F 30/27; G06T 17/20
USPC ......................................................... 703/1
See application file for complete search history.

(56) References Cited

U.S. PATENT DOCUMENTS

| | | | |
|---|---|---|---|
| 8,594,701 B2 | 11/2013 | Pakzad | |
| 8,744,812 B2 | 6/2014 | Cruz | |
| 9,285,227 B1 | 3/2016 | Chao et al. | |
| 9,501,805 B2 | 11/2016 | McLean | |
| 10,387,811 B2 | 8/2019 | Carnevale et al. | |
| 10,691,081 B2 | 6/2020 | Ray et al. | |
| 10,831,941 B2* | 11/2020 | Desai et al. | G06F 30/18 703/2 |
| 10,917,740 B1 | 2/2021 | Scott et al. | |
| 10,943,210 B2 | 3/2021 | Hance et al. | |
| 11,209,798 B1 | 12/2021 | Michalowski et al. | |
| 11,263,363 B2 | 3/2022 | Gifford | |
| 11,271,222 B2 | 3/2022 | Dede et al. | |
| 11,272,316 B2 | 3/2022 | Scott et al. | |
| 2004/0034555 A1 | 2/2004 | Dismukes et al. | |
| 2004/0078257 A1 | 4/2004 | Schweitzer et al. | |
| 2004/0113945 A1 | 6/2004 | Park et al. | |
| 2006/0217876 A1 | 9/2006 | Houri et al. | |
| 2009/0300174 A1 | 12/2009 | Floris et al. | |
| 2010/0198563 A1 | 8/2010 | Plewe | |
| 2010/0218131 A1 | 8/2010 | Holm-Petersen et al. | |
| 2012/0072181 A1 | 3/2012 | Imani | |
| 2012/0096417 A1 | 4/2012 | Durbha et al. | |
| 2013/0073344 A1 | 3/2013 | Parent | |
| 2013/0197799 A1 | 8/2013 | Cho et al. | |
| 2014/0278280 A1 | 9/2014 | Pardo-Fernandez | |
| 2016/0012357 A1 | 1/2016 | Wood | |
| 2016/0012359 A1 | 1/2016 | Wood | |
| 2016/0161263 A1 | 6/2016 | Patel | |
| 2018/0047121 A1 | 2/2018 | Bhattacharyya | |
| 2018/0068255 A1 | 3/2018 | Hance et al. | |
| 2018/0094936 A1 | 4/2018 | Jones et al. | |
| 2018/0137214 A1 | 5/2018 | Benjamin et al. | |
| 2018/0288850 A1 | 10/2018 | Kumar et al. | |
| 2018/0300435 A1 | 10/2018 | Eckman et al. | |
| 2018/0364719 A1 | 12/2018 | Wang et al. | |
| 2018/0365347 A1 | 12/2018 | Wang et al. | |
| 2019/0026949 A1 | 1/2019 | Alabastro et al. | |
| 2019/0102486 A1* | 4/2019 | Desai | G06Q 50/06 |
| 2019/0188338 A1 | 6/2019 | Srivastava et al. | |
| 2019/0347367 A1 | 11/2019 | Livnat | |
| 2019/0354641 A1 | 11/2019 | Masoud et al. | |
| 2020/0034503 A1 | 1/2020 | Livnat | |
| 2020/0104431 A1 | 4/2020 | Ginsberg | |
| 2020/0272956 A1 | 8/2020 | Livnat | |
| 2020/0311320 A1 | 10/2020 | Wang et al. | |
| 2021/0073449 A1* | 3/2021 | Segev | G06N 5/025 |
| 2022/0007601 A1 | 1/2022 | Coffin et al. | |

OTHER PUBLICATIONS

Cascio, Ermanno Lo, et al. "Residential building retrofit through numerical simulation: a case study." Energy Procedia 111 (2017): 91-100. (Year: 2016).*

Abdulbasit Almhafdy, Norhati Ibrahim, Sabarinah Sh Ahmad, Josmin Yahya, Courtyard Design Variants and Microclimate Performance, Procedia—Social and Behavioral Sciences, vol. 101, 2013, pp. 170-180, ISSN 1877-0428, https://doi.org/10.1016/j.sbspro.2013.07.190. (Year: 2013).*

Flack, Robert WJ, and Brian J. Ross. "Evolution of architectural floor plans." European conference on the applications of evolutionary computation. Springer, Berlin, Heidelberg, 2011. (Year: 2011).*

Osman, Hesham M., Maged E. Georgy, and Moheeb E. Ibrahim. "A hybrid CAD-based construction site layout planning system using genetic algorithms." Automation in construction 12.6 (2003): 749-764. (Year: 2003).*

Bassett, E. M., and F. B. Williams. Municipal Zoning Enabling Act. Jun. 1958. (Year: 1958).*

Koenig, Reinhard, and Katja Knecht. "Comparing two evolutionary algorithm based methods for layout generation: Dense packing versus subdivision." AI Edam 28.3 (2014): 285-299. (Year: 2014).*

Final Office Action received for U.S. Appl. No. 17/098,214 dated Jun. 1, 2022, 40 pages.

Dorismond, Jessica, "Supermarket Optimization: Simulation Modeling and Analysis of a Grocery Store Layout", University at Buffalo, State University of New York, 2016, pp. 3656-3657.

Ozgormus, Elif, "Optimization of Block Layout for Grocery Stores", Auburn University, 2015, pp. 134 pages.

(56) References Cited

OTHER PUBLICATIONS

Bhadury et al., "Store Layout Using Location Modeling to Increase Purchases", University of North Carolina at Greensboro, 2016, pp. 1-32.
International Search Report for application No. PCT/US2020/060861 dated Feb. 11, 2021.
Non Final Office Action received for U.S. Appl. No. 17/098,214 dated Feb. 18, 2022, 23 pages.
Rubin, Arthur., "Office Design Measurements for Productivity—A Research Overview", U.S. Department of Commerce, Dec. 1987, 78 pages.
Ranne et al., "People Flow Experience in Offices", A handbook for planning office spaces Kone Corporation, 2017, 24 pages.
Autodesk, "Factory Design Suite 2011", Accelerate your Factory Layout Process, 2011, 4 pages.
Tachikawa et al., "Office Layout Support System using Genetic Algorithm—Generation of Layout Plans for Polygonal Space—", 2010 Second World Congress on Nature and Bilogically Inspired Computer, Dec. 15-17, 2010, pp. 280-285.
Li et al., "A Constraint Based Generative System for Floor Layout Computer Science", 2000, pp. 417-426.
Anderson et al., "Augmented Space Planning: Using Procedural Generation to Automate Desk Layouts", International Journal of Architectural Computing, vol. 16, No. 2, 2018, pp. 164-177.
Non Final Office Action received for U.S. Appl. No. 17/098,282 dated Mar. 17, 2022, 18 pages.
Non Final Office Action received for U.S. Appl. No. 17/098,214 dated Sep. 19, 2022, 24 pages.
Seppanen et al., "Facilities Planning with Graph Theory", Management Science, vol. 17, No. 4, Dec. 1970, pp. B-242-B253.
Nagy, Danil, "Routing with graphs", Generative Design, Mar. 2, 2018, 14 pages.
Liggett, Robin S., "Automated facilities layout: past, present and future" Automation in Construction, vol. 9, 2000, pp. 197-215.
Homayouni, Hoda, "A Survey of Computational Approaches to Space Layout Planning (1965-2000)", 2007, 18 pages.
Watson, Kelvin, "Graph Theoretic Facility Layout Design and Evaluation: Theoretical and Practical Considerations", Jan. 1996, 369 pages.
Non Final Office Action received for U.S. Appl. No. 17/098,287 dated Aug. 22, 2022, 45 pages.
Final Office Action received for U.S. Appl. No. 17/098,282 dated Aug. 5, 2022, 27 pages.
Murakami et al. "Coupled Simulations of indoor-outdoor flow fields for cross-ventilation of a building in a simplified urban array", Atmosphere, vol. 9, Jun. 4, 2018, 16 pages.
Chen et al., "Numerical Simulations of Noise Induced by Flow in HVAC Ventilation Ducts", SAE International Journal of Materials and Manufacturing, vol. 4, No. 1, 2011, pp. 696-707.
Notice of Allowance received for U.S. Appl. No. 17/098,282 dated Oct. 20, 2022, 13 pages.
Non Final Office Action received for U.S. Appl. No. 17/098,280 dated Nov. 3, 2022, 38 pages.
Azhar et al., "Building Information Modeling for Sustainable Design and LEED® Rating Analysis", Automation in Construction, vol. 20, No. 2, 2010, pp. 217-224.
Final Office Action received for U.S. Appl. No. 17/098,287 dated Dec. 2, 2022, 34 pages.
Final Office Action received for U.S. Appl. No. 17/098,214 dated Jan. 9, 2023, 33 pages.
Final Office Action received for U.S. Appl. No. 17/098,280 dated Mar. 6, 2023, 33 pages.
Non Final Office Action received for U.S. Appl. No. 17/098,214 dated Apr. 17, 2023, 35 pages.
Non Final Office Action received for U.S. Appl. No. 17/098,228 dated Mar. 23, 2023, 65 pages.
Soltani et al., "A fuzzy based multi-objective path planning of construction sites", Automation in Construction, vol. 13, No. 6, 2004, pp. 717-734.
Notice of Allowance received for U.S. Appl. No. 17/098,287 dated Jul. 11, 2023, 13 pages.
Notice of Allowance received for U.S. Appl. No. 17/098,280 dated Sep. 7, 2023, 17 pages.
Final Office Action received for U.S. Appl. No. 17/098,228 dated Aug. 14, 2023, 49 pages.
Final Office Action received for U.S. Appl. No. 17/098,214 dated Jul. 26, 2023, 26 pages.
Non Final Office Action received for U.S. Appl. No. 17/098,228 dated Jan. 11, 2024, 53 pages.

\* cited by examiner

GENERATING VIABLE BUILDING DESIGNS FOR COMPLEX SITES

CROSS-REFERENCE TO RELATED APPLICATIONS

This application claims priority benefit of the United States Provisional Patent Application titled, "COMPUTER-IMPLEMENTED TECHNIQUES FOR DESIGNING FACTORIES AND WORK SPACES," filed on Nov. 18, 2019 and having Ser. No. 62/937,190. The subject matter of this related application is hereby incorporated herein by reference.

BACKGROUND

Field of the Various Embodiments

The various embodiments relate generally to computer science and computer-aided design and, more specifically, to computer-implemented techniques for generating viable building designs for complex sites.

Description of the Related Art

Generating a building design and layout, such as for a factory or workplace, oftentimes is a complex process where many different design goals as well as numerous constraints and requirements must be considered. For example, when designing a factory or other similarly intricate industrial building, a designer has to consider, among other things, operating requirements, production requirements, architectural and engineering constraints, cost constraints, and building site constraints.

In a data-driven approach to building design analysis, a designer typically uses computer-aided design (CAD) software to generate one or more designs for a building, where the layout of the building is optimized based on measurements, metrics, and other data corresponding to different design goals. In this type of approach, the designer either starts with a known building footprint and, using the CAD software, generates multiple interior layouts that satisfy the different design goals, while fitting within the building footprint, or starts with one or more interior layouts that satisfy the different design goals and, using the CAD software, generates multiple building footprints based on the different interior layouts. For many "simple" building site shapes, such as rectangular sites or sites with obtuse-angled corners, the building site can easily accommodate most building designs. Accordingly, for these types of site shapes, either design approach typically results in numerous building designs that are not adversely impacted by the shape of the building site. Thus, for a given building site having a "simple" building site shape, a designer can readily use conventional CAD software to generate and identify an optimized building design for that building site.

By contrast, conventional CAD applications are not configured to effectively handle "complex" building site shapes, such as triangular sites, sites with acute-angled corners, and sites with irregular shapes and/or offshoots. Among other things, the geometric features of "complex" building site shapes oftentimes restrict both the building designs that can be used on the building site and where a building can be placed within the building site, and conventional CAD applications are not designed to account for geometrically "complex" building site features early in the design process. As a result, a conventional CAD application is unable to effectively explore an overall design space where the efficient use of a building site having a "complex" shape is balanced against multiple building performance metrics. Consequently, very few, if any, of the building designs generated using a conventional CAD application optimize the efficient use of a "complex" building site shape against overall building performance.

As the foregoing illustrates, what is needed in the art are more effective techniques for generating viable designs for building sites having complex shapes.

SUMMARY

One embodiment of the present application sets forth a computer-implemented method for determining building layouts for a site. The method includes: generating a first group of processing areas from a plurality of processing areas associated with the building design and a second group of processing areas from the plurality of processing areas; generating a first building footprint leg that is sized to include the first group of processing areas and a second building footprint leg that is sized to include the second group of processing areas; at a pivot location, joining the first building footprint leg and the second building footprint leg at an aperture angle; performing a numerical simulation to position the first group of processing areas in the first building footprint leg and the second group of processing areas in the second building footprint leg to generate a candidate building design for the building site; and rendering for display the candidate building design.

At least one technical advantage of the disclosed techniques relative to the prior art is that the disclosed techniques can be incorporated into a CAD application to enable the CAD application to automatically explore a design space to identify regions where the efficient use of a "complex" building site shape is optimized against overall building performance. Accordingly, with the disclosed techniques, a CAD application can generate, for example, a building footprint with an interior layout that is optimized to efficiently utilize a building site having a "complex" shape. This functionality, which is not available in conventional CAD applications, increases the likelihood that appropriately optimized building footprints and associated interior layouts can be automatically generated and identified for any given building site shape. These technical advantages represent one or more tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

According to various embodiments described herein, a computer system generates, via a generative design process, one or more building designs based on a set of site constraints and/or other building design parameters. Each building design may indicate a size and shape of the footprint of the building. Additionally, each building design may indicate an orientation of the building with respect to the building site and a location of the building within the building site. One embodiment of such a generative design process is described below in conjunction with in FIG. 1.

Figure 1:
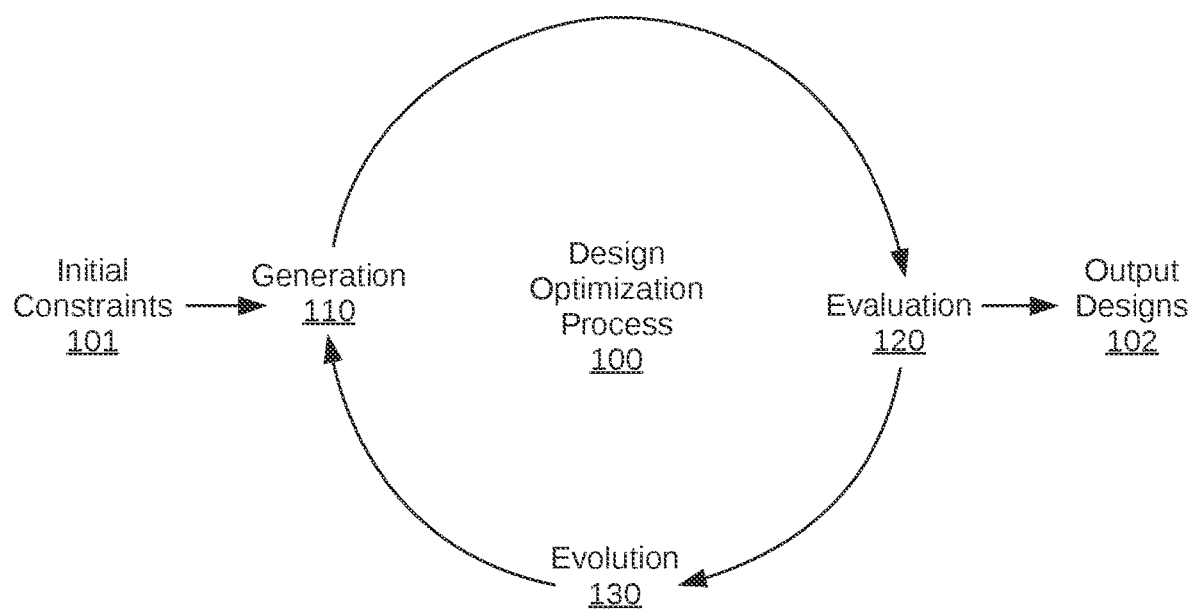
FIG. 1 is a schematic diagram illustrating a generative design process, according to various embodiments.

FIG. 1 is a conceptual diagram illustrating a design optimization process 100, according to various embodiments. Design optimization process 100 is a generative design process for generating one or more candidate building designs (output designs 102) based on initial constraints 101, and can be performed by a computing device or computing system. In some embodiments, the candidate building designs are for the internal and external configurations of a factory building or other manufacturing facility. As shown, design optimization process 100 includes a generation phase 110, an evaluation phase 120, and an evolution phase 130.

In generation phase 110, one or more building designs are generated. Generally, each building design includes a footprint that indicates a perimeter of a building and a layout of the building. The layout that is included in a building design indicates a specific configuration of work stations, office space, aisles, corridors and other traffic areas, and specialized processing areas specific to the particular application of the factory building being designed.

In some embodiments, a group of building designs is generated in one iteration of generation phase 110 based on a specific set of values for geometric parameters of the design (described below in conjunction with FIGS. 3 and 4). The values for the geometric parameters are determined in evolution phase 130 of a previous iteration of design optimization process 100. A group of building designs generated in a particular iteration of generation phase 110 is referred to herein as a "generation" of building designs, and include as few as a single build design and up to hundreds of building designs. The building designs included in a particular generation are generated based on the values of one or more performance metrics for a preceding generation of building designs generated by design optimization process 100. In some embodiments, the number of building designs per generation is a user-selected value. In other embodiments, the number of building designs per generation is an automatically generated number. In such embodiments, the automatically generated number can be a function of the complexity of a particular building design scenario, which is indicated by the number of performance metrics included in initial constraints 101 and on the number of geometric parameters employed to describe candidate building designs in design optimization process 100.

In the design process for a particular building, initial constraints 101 include one or more of site constraints and other site data, operation and workspace data associated with processes to be performed in the building, and one or more performance metrics for quantitatively evaluating building designs for a particular building. Examples of performance metrics include construction cost of the building, workflow efficiency for processes within the building, suitability for future expansion and/or transformation of the building, sustainability certification level of the building, quality of employee working conditions, ventilation efficiency of the building, energy consumption of the building, and/or the like. In some embodiments, initial constraints 101 further include weighting factors for the above-described performance metrics, where such weighting factors are employed in evaluation phase 120 to determine the overall performance of a building design.

In some embodiments, a group of user-selected designs can be employed for the first generation of building designs. Alternatively or additionally, in some embodiments, a group of computationally generated designs can be employed for the first generation of building designs. In such embodiments, geometric parameters of the design may be selectively varied between the different building designs included in the first generation. For example, for a first generation of building designs that includes 50 building design instances, the input space described by each geometric parameter can be varied across 50 different values. In this way, the solution space of possible parameters can be explored as much as possible, which enables design optimization process 100 to ultimately find the regions of the solution space that include the highest-performing building designs.

In evaluation phase 120, for each building design included in the current generation, values for each performance metric are determined. Generally, each value is determined algorithmically, based on the geometric parameters of a particular building design and/or on additional analysis performed on the particular building design. Examples of such additional analysis include numerical simulations of work and material flow within the building, air flow and heat transfer to and from an environment surrounding the building, construction cost, and the like. In some embodiments, a single performance score is determined for each building design in the current generation based on a plurality of performance metric values for that building design. In such embodiments, predetermined weighting may be applied to some or all of the different performance metric values.

In evolution phase 130, an optimization solver is employed to modify some or all geometric parameters of some or all of the building designs in the current generation and/or to remove certain building designs from further consideration. With each iteration of design optimization process 100, the optimization solver incrementally improves understanding of what geometric parameter values and combinations of such values provide better performance for a building design. In some embodiments, in a given iteration of evolution phase 130, the optimization solver employs one or more evolution operators (e.g., breeding or selection) to combine certain geometric parameter values that are more likely to create a better-performing building design. Additionally, in a given iteration of evolution phase 130, the optimization solver may employ one or more evolution operators to remove or modify geometric parameter values associated with poorly-performing building designs. Thus, with each iteration of design optimization process 100, the optimization solver better determines what solutions are more likely to have high performance.

Figure 2:
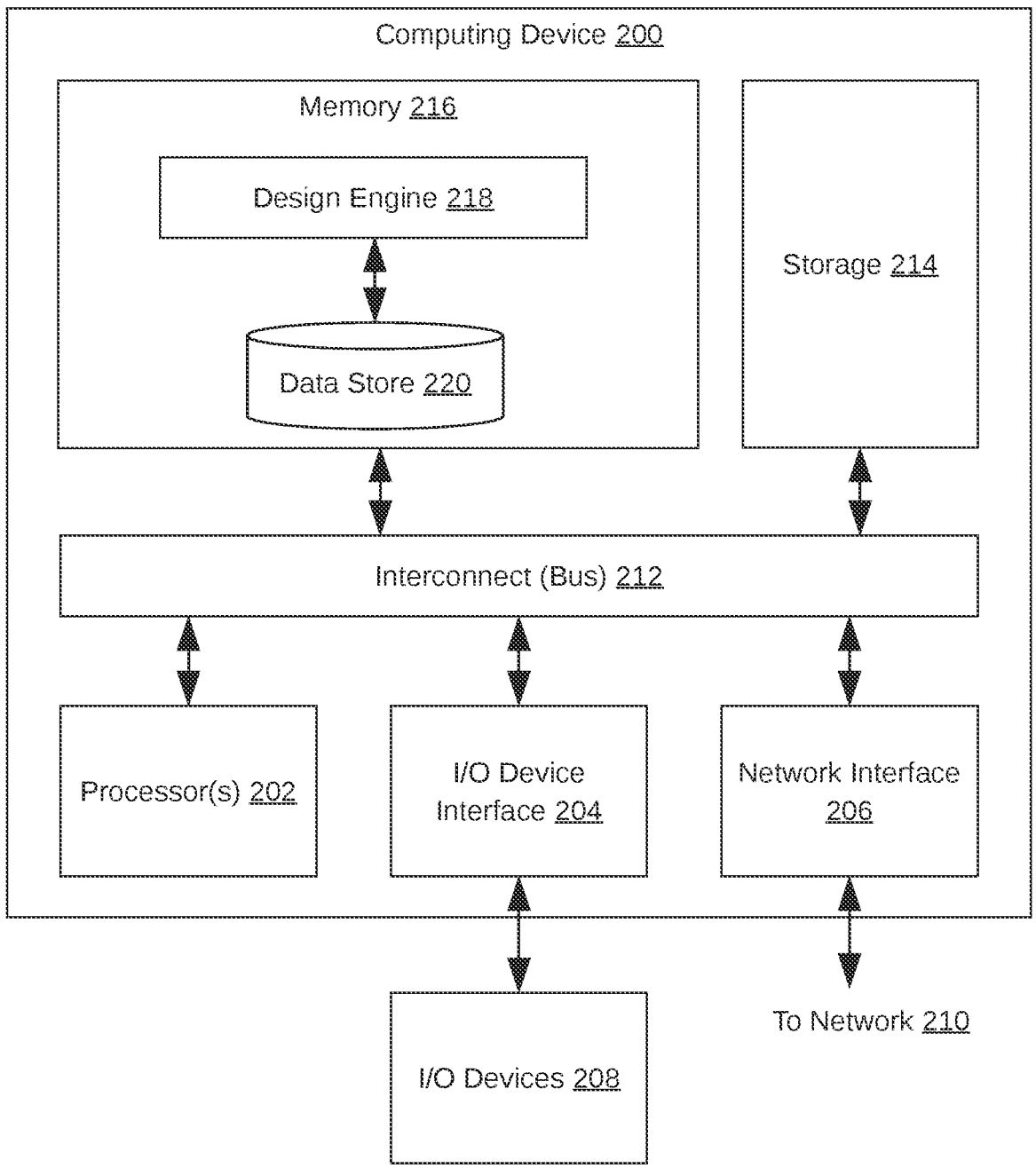
FIG. 2 illustrates a computing device configured to implement one or more aspects of the various embodiments.

FIG. 2 illustrates a computing device 200 configured to implement one or more aspects of the various embodiments. As shown, computing device 200 includes an interconnect (bus) 212 that connects one or more processing units 202, an input/output (I/O) device interface 204 coupled to one or more input/output (I/O) devices 208, memory 216, a storage 214, and a network interface 206.

Computing device 200 includes a desktop computer, a laptop computer, a smart phone, a personal digital assistant (PDA), tablet computer, or any other type of computing device configured to receive input, process data, and optionally display images, and is suitable for practicing one or more embodiments. Computing device 200 described herein is illustrative and that any other technically feasible configurations fall within the scope of the present disclosure.

Processing unit(s) 202 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 202 may be any technically feasible hardware unit capable of processing data and/or executing software applications. Further, in the context of this disclosure, the computing elements shown in computing device 200 may correspond to a physical computing system (e.g., a system in a data center) or may be a virtual computing instance executing within a computing cloud.

In one embodiment, I/O devices 208 include devices capable of providing input, such as a keyboard, a mouse, a touch-sensitive screen, and so forth, as well as devices capable of providing output, such as a display device. Additionally, I/O devices 208 may include devices capable of both receiving input and providing output, such as a touchscreen, a universal serial bus (USB) port, and so forth. I/O devices 208 may be configured to receive various types of input from an end-user (e.g., a designer) of computing device 200, and to also provide various types of output to the end-user of computing device 200, such as displayed digital images or digital videos or text. In some embodiments, one or more of I/O devices 208 are configured to couple computing device 200 to a network 210.

Network 210 includes any technically feasible type of communications network that allows data to be exchanged between computing device 200 and external entities or devices, such as a web server or another networked computing device. For example, network 210 may include a wide area network (WAN), a local area network (LAN), a wireless (WiFi) network, and/or the Internet, among others.

Storage 214 includes non-volatile storage for applications and data, and may include fixed or removable disk drives, flash memory devices, and CD-ROM, DVD-ROM, Blu-Ray, HD-DVD, or other magnetic, optical, or solid-state storage devices. Design engine 218 and data store 220 may be stored in storage 214 and loaded into memory 216 when executed.

Memory 216 includes a random-access memory (RAM) module, a flash memory unit, or any other type of memory unit or combination thereof. Processing unit(s) 202, I/O device interface 204, and network interface 206 are configured to read data from and write data to memory 216. Memory 216 includes various software programs that can be executed by processor(s) 202 and application data associated with said software programs, including design engine 218 and data store 220. Design engine 218 and data store 220 are described in further detail below with respect to FIG. 3.

In operation, design engine 218 is configured to design and optimize buildings such as manufacturing facilities, factories, and/or other workplaces. Design engine 218 receives input from data store 220 that describe various aspects of the building being designed, such as a site on which the building is to be built, operations to be performed in the building, and various other constraints and requirements for the building. Design engine 218 generates a spectrum of potential building designs based on the received input.

A building design may include, for example, a building footprint; a layout of the building footprint within a site, such as a location and/or orientation of the building footprint in the site; a building geometry, such as a floor plan and/or a three-dimensional model of the building; and/or a layout of rooms, systems, infrastructure, work stations, and other elements of the building.

Design engine 218 evaluates the generated designs based on one or more performance metrics. Design engine 218 uses the results of the evaluation to further optimize and refine the generated designs to produce additional building designs, for example via design optimization process 100 in FIG. 1. Additionally, design engine 218 presents the results of the evaluation to an end user. Design engine 218 may be implemented as various software modules to generate and/or optimize building designs as described above. One embodiment of such software modules is described below in conjunction with FIG. 3.

Figure 3:
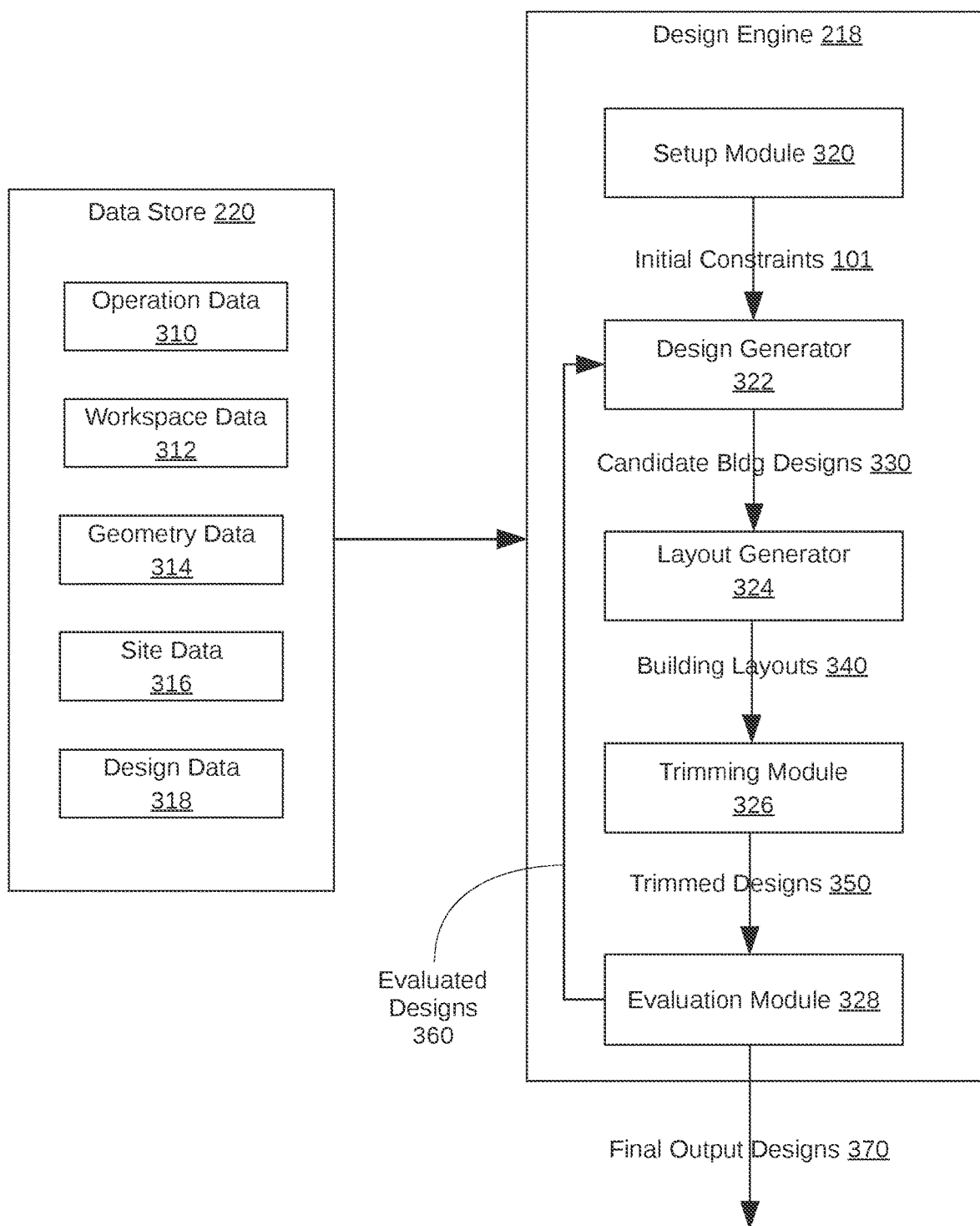
FIG. 3 is a more detailed illustration of the data store and design engine of FIG. 2, according to various embodiments.

FIG. 3 is a more detailed illustration of design engine 218 and data store 220 of FIG. 2, according to various embodiments. As shown, design engine 218 is coupled to data store 220 and includes, without limitation, a setup module 320, a design generator 322, a layout generator 324, a trimming module 326, and an evaluation module 328.

In one or more embodiments, design engine 218 obtains data describing requirements and constraints associated with generating building designs for the building from data store 220. Additionally, in some embodiments, design engine 218 may store generated data to data store 220, such as building geometries, building layouts, values for performance metrics associated with a particular building design, and/or evaluation results. As shown in FIG. 3, data store 220 includes, without limitation, operation data 310, workspace data 312, geometry data 314, site data 316, and design data 318.

Operation data 310 includes data describing operations of the building. In some embodiments, data describing operations of a building include data indicating numbers and types of workspaces, workstations, operators, personnel, schedules, zones, positions, tools, storage facilities, parts, materials, equipment, transport requirements or restrictions, and/ or other elements and features associated with operations of the factory. Additionally or alternatively, in some embodiments, data describing operations of a workplace include data indicating numbers and/or sizes of office spaces, desks, meeting rooms, common areas, amenities such as restrooms or breakrooms, staff, office personnel, schedules, zones, equipment, space requirements or restrictions, and/or other elements and features associated with the workplace.

Workspace data 312 includes data describing workstations or workspaces of the building. A workspace or workstation may generally refer to any defined space within the building, open or enclosed, for employees to perform work, such as a meeting room, office, group of desks, group of cubicles, warehouse space, manufacturing bay, and/or the like. In some embodiments, workspace data 312 describing a particular workspace or workstation include data indicating one or more operations associated with the workstation, one or more operation tasks associated with the workstation, dimensions of the workstation, a shape of the workstation, and/or other information related to the workstation. Additionally or alternatively, in some embodiments, workspace data 312 describing a workspace include data indicating one or more personnel types associated with the workspace, one or more categories or functions associated with the workspace, a shape of the workspace, dimensions of the workspace, a type and number of elements associated with the workspace such as desks, tables, and seating, and/or other information related to the workspace.

Geometry data 314 includes data describing one or more building designs. For example, the data describing a particular building design may include data indicating a size of the building, a shape of the building, a footprint of the building, an orientation of the building structural elements of the building, fixed equipment within the building and locations of the fixed equipment, and infrastructure of the building such as loading docks, entrances, exits, and mechanical systems. In some embodiments, geometry data 314 includes a three-dimensional (3D) model of the building, a wireframe model of the building, a surface mesh of the building, a footprint of the building, a floorplan of the building, images or renders of the building from one or more views, and/or other visualizations of the building geometry. The geometry data 314 may be data that were generated by design engine 218, data received from another application or tool, data entered or otherwise provided by a user, or a combination thereof.

In some embodiments, geometry data 314 includes a layout indicating locations of workstations or workspaces within the building. The layout may be data generated by design engine 218 (e.g., station layout 250 and evaluation results 290), generated by another application or tool, or designed by a user. In some embodiments, design engine 218 generates the layout for the building based on information describing the building, such as operation data 310 and workspace data 312. In some embodiments, geometry data 314 includes one or more visualizations of the building, and the visualizations may include visualizations of workstations and workspaces within the building according to the layout.

In some embodiments, geometry data 314 includes values for one or more geometric parameters associated with different building designs. As described above, design engine 218 modifies the geometric parameters as part of design optimization process 100. Examples of such geometric parameters are described below in conjunction with FIG. 4.

Figure 4:
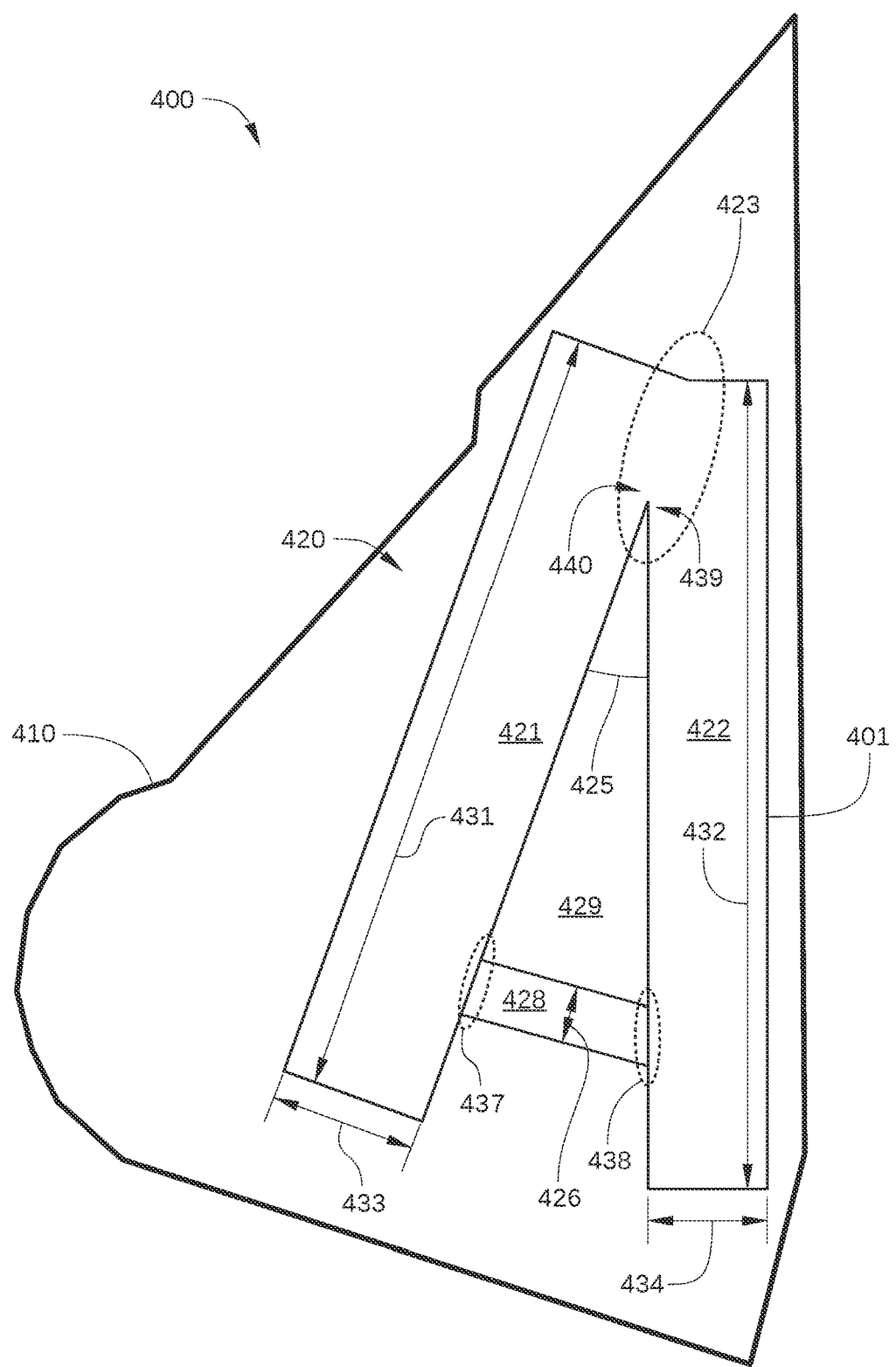
FIG. 4 illustrates an exemplar candidate building design generated by the design engine of FIG. 2, according to various embodiments.

FIG. 4 illustrates an exemplar candidate building design 400 generated by design engine 218 of FIG. 2, according to various embodiments. Candidate building design 400 is shown positioned within a building site 410 and includes multiple portions 420 generated by design engine 218. In the embodiment illustrated in FIG. 4, portions 420 generated by design engine 218 include a first building footprint leg 421 and a second building footprint leg 422 that are joined at a pivot location 423. Together, first building footprint leg 421, second building footprint leg 422, and pivot location 423 describe an aperture angle 425.

In some embodiments, portions 420 of candidate building design 400 that are generated by design engine 218 further include a building footprint connecting bar 428 that is joined to first building footprint leg 421 and second building footprint leg 422 as shown. In such embodiments, the inclusion of building footprint connecting bar 428 may form a courtyard 429 that is disposed within a footprint 401 of candidate building design 400 but does not provide useful floor space for manufacturing or other processes associated with candidate building design 400. Building footprint connecting bar 428 is joined to first building footprint leg 421 at a position 437 (e.g., an intersection point or area) along a length 431 of first building footprint leg 421. In addition, building footprint connecting bar 428 is joined to second building footprint leg 422 at a position 438 (e.g., an intersection point or area) along a length 432 of second building footprint leg 421. Building footprint connecting bar 428 is generated with a width 426.

As noted above, a building design or a group of building designs is generated in one iteration of generation phase 110 based on a specific set of values for geometric parameters of the building design or group of designs. For each iteration of generation phase 110, some or all geometric parameters of each building design is modified. Examples of such geometric parameters for candidate building design 400 include one or more of length 431 of first building footprint leg 421, a width 433 of first building footprint leg 421, length 432 of second building footprint leg 422, a width 434 of second building footprint leg 422, aperture angle 425, position 437 along length 431 of first building footprint leg 421, position 438 along length 432 of second building footprint leg 422, a position 439 along length 432 at which an edge (e.g., a wall) of first building footprint leg 421 is joined to an edge (e.g., a wall) of second building footprint leg 422, and/or a position 440 along length 431 at which an edge of second building footprint leg 422 is joined to and edge of first building footprint leg 421, and width 426. Alternatively or additionally, in some embodiments, examples of such geometric parameters for candidate building design 400 include one or more geometric parameters associated with or indicating how candidate building design 400 is positioned and/or oriented within a building site 410. Thus, from one iteration to the next of design optimization process 100, a new generation of building designs is generated by modifying some or all building designs in the previous generation, using one or more of the above geometric parameters. For example, first building footprint leg 421 can be moved along length 432 of second building footprint leg 422 from position 438 to a different position; length 431 of first building leg 421 can be increased or decreased; aperture angle 425 can be increased or decreased, etc.

In some embodiments, first building footprint leg 421 is sized to include a first group of processing areas that are associated with specific processes performed in candidate building design 400, and second building footprint leg 422 is sized to include a second group of processing areas that are associated with specific processes performed in candidate building design 400. In some embodiments, such sizing of first building footprint leg 421 and/or second building footprint leg 422 may be performed by setup module 320 prior to iterating design optimization process 100. Alternatively or additionally, in some embodiments, such sizing may be performed by design generator 322 during one or more iterations of design optimization process 100.

In some embodiments, width 433 of first building footprint leg 421 and/or width 434 of second building footprint leg 422 can be incrementally modified in a particular candidate building design 400 from one iteration to the next of design optimization process 100. Alternatively or additionally, in some embodiments, width 433 is determined based on one or more specific processes performed in first building footprint leg 421. For example, in some embodiments, a process circulation type of first building footprint leg 421 indicates a discrete number of aisles, corridors and/or open areas that should be present within first building footprint leg 421 for materials to circulate effectively in candidate building design 400. In such embodiments, available modifications to width 433 may be limited to discrete values or ranges of values. For example, for one circulation type, width 433 may be limited to a first range of values that accommodate one aisle disposed between two rows of work stations, while for another circulation type, width 433 may be limited to a second range of values that accommodate two parallel aisles disposed between three parallel rows of work stations. In the same vein, in some embodiments, a process circulation type of second building footprint leg 422 indicates a discrete number of aisles and/or open areas that should be present within second building footprint leg 422 for materials to circulate effectively in candidate building design 400.

In some embodiments, other geometric parameters besides those described above can be modified during iterations of design optimization process 100. For example, in some embodiments, a number of building footprint legs, a number of pivot locations, and/or a number of building footprint connecting bars can be changed. In some embodiments, one or more of the number of building footprint legs, the number of pivot locations, and/or the number of building footprint connecting bars can be a user-selected value. Alternatively or additionally, in some embodiments, one or more of the number of building footprint legs, the number of pivot locations, and/or the number of building footprint connecting bars can be automatically determined by design engine 219 based on site data 318.

Returning to FIG. 3, site data 316 includes data describing a site at which the building is to be constructed. For example, the data describing the site may include data indicating a location of the site, a size of the site, a shape of the site, an orientation of the site, fixed equipment within the site and locations of the fixed equipment, utilities around or underneath the site, topography of the site, elevation(s) of the site, soil conditions of the site, restriction(s) on the site, and infrastructure of the site such as roads and paths.

Design data 318 includes data associated with one or more designs of the building. For example, data describing a building design may include restrictions and requirements associated with the building design, such as production requirements (e.g. number of workstations, number of production bays, target production rate, target production efficiency), workspace requirements (e.g. number of desks, number of common areas and amenities, number of meeting rooms), building size requirements, capacity requirements, infrastructure requirements, system requirements, accessibility requirements, architectural and engineering constraints, and so forth. In some embodiments, design data 318 includes data describing materials associated with the building design, such as windows, doors, cladding, piping and plumbing types and sizes, wiring types and sizes, and mechanical systems such as heating, ventilation and air conditioning (HVAC) systems. The data describing the materials may include estimated costs for each material.

In operation, setup module 320 collects information from data store 220 and/or receives data for generation via design optimization process 100 of building designs for a specific building site and building application. Based on the collected and/or received data, setup module 320 generates or determines initial constraints 101 for design optimization process 100. Initial constraints 101 may include one or more performance metrics for quantitatively evaluating building designs for a particular building and the geometric parameters available for modifying such building designs. In some embodiments, some or all of the performance metrics and/or geometric parameters included in initial constraints 101 are user selected. Alternatively or additionally, in some embodiments, setup module 320 selects some or all of the performance metrics and/or geometric parameters included in initial constraints 101 algorithmically. In such embodiments, setup module 320 may select performance metrics and/or geometric parameters based on site constraints, other site data, and/or operation and workspace data associated with processes to be performed in the building. In some embodiments, the data included in initial constraints 101 is based on operation data 310, workspace data 312, geometry data 314, site data 316, and/or design data 318.

Design generator 320 receives initial conditions 101 from setup module 320 or evaluated designs 360 from evaluation module 328 and generates a generation of candidate building designs 330. In some embodiments, a generation of candidate building designs 330 includes one or more instances of building designs to be evaluated and modified by design engine 218. In general, the one or more instances of building designs included in a generation of candidate building designs 330 are generated by design engine 218. In such embodiments, design engine 218 follows an automated procedure (described below in conjunction with FIG. 5) for generating each instance of building design included in candidate building designs 330.

In some embodiments, each instance of building design in candidate building designs 330 includes data indicating the size and shape of a footprint of the building (e.g., specific values for the geometric parameters included in initial conditions 101) and data indicating placement of the building within the site (e.g., location and orientation of the building on the site). In some embodiments, the footprint of each candidate building design 330 includes a first building footprint leg (e.g., first building footprint leg 421 of FIG. 4) and a second building footprint leg (e.g., second building footprint leg 422 of FIG. 4) that are joined at a pivot location and describe an aperture angle (e.g., aperture angel 425 of FIG. 4). In some embodiments, the footprint of one or more candidate building designs 330 may include more than two building footprint legs that are joined at more than one pivot location. In some embodiments, the footprint of one or more candidate building designs 330 may further include a building footprint connecting bar (e.g., building footprint connecting bar 428 of FIG. 4).

In some embodiments, each instance of building design in candidate building designs 330 includes a visualization of the building geometry, such as a 2D footprint of the building and/or a 3D model of the building. In some embodiments, each instance of building design in candidate building designs 330 also indicates a placement of the building within the site, such as location and orientation of the building on the site.

In some embodiments, a first generation of building designs acts as a starting point for design optimization process 100. In such embodiments, one or more instances of building designs included in the first generation of building designs are user provided by a user or are based at least in part on user inputs.

Layout generator 324 receives candidate building designs 330 from design generator 322 and other data from data store 220, such as operation data 310 and workspace data 312, and generates a station layout 340 for each instance of building design included in candidate building designs 330. Station layout 340 indicates locations within a candidate building design 330 for a plurality of workstations, workspaces, and/or application-specific processing areas of the building. In some embodiments, station layout 340 also indicates locations within the building of other rooms or elements of the building, such as storage facilities, tools, supplies, entrances, exits, elevators, stairs, material transport paths or structures, office space, aisles, corridors, other traffic areas, and/or other rooms or elements employed in factory or workplace operations.

In some embodiments, for each candidate building design 330, layout generator 324 generates a station layout 350 by performing one or more numerical computer simulations of the candidate building design 330 to position a first group of processing areas in a first building footprint leg of the candidate building design 330 and a second group of processing areas in a second building footprint leg of the candidate building design 330. In some embodiments, the numerical computer simulations include automatic placement of the different stations, processing areas, material transport paths or structures, office space(s), aisle, corridors, other traffic areas, and/or other rooms or elements employed in factory or workplace operations. In such embodiments, the automatic placement performed by layout generator 324 is based on a packing algorithm that is driven by driven by adjacency relationships. An example of one such numerical computer simulation scheme is described in greater detail in U.S. Patent Application 62/937,188 filed Nov. 18, 2019 and entitled "Computer-Implemented Techniques for Designing Office Spaces."

Trimming module 326 receives a station layout 340 for each instance of building design included in candidate building designs 330 and generates a trimmed building design 360 for each station layout 340. In some embodiments, trimming module 326 performs one or more operations to remove one or more regions of excess space from the station layout, such as over-sized corridors or aisles. In some embodiments, such operations include: identifying one or more regions of excess space based on operation data 310 and/or other operational information associated with the candidate building design, determining which regions of excess space are adjacent to a footprint boundary of the candidate building design 330, and removing the region of excess space from the candidate building design 330 by modifying the footprint boundary.

Evaluation module 326 receives a trimmed building design 350 for each instance of building design included in candidate building designs 330 and evaluates each trimmed building design 350. Based on the evaluation, evaluation module 326 generates one or more evaluated designs 360 and/or final output designs 370. Specifically, evaluation module 326 computes values of one or more performance metrics for each trimmed building design 350 in the generation of candidate building designs 330. Based on the values computed for the performance metrics, evaluation module 326 determines whether certain evaluation criteria are met. When the evaluation criteria are met, evaluation module 326 generates final output designs 370. When no evaluation criteria are met, evaluation module 326 generates evaluated designs 360, which are sent to design generator 322 for further optimization and refinement to produce additional building designs, for example via design optimization process 100 in FIG. 1.

In some embodiments, evaluated designs 360 include each trimmed building design 350 that does not satisfy certain performance criteria for the building. In such embodiments, evaluated designs 360 may further include the computed values for the performance metrics for each trimmed building design 350 that fails to satisfy certain performance criteria for the building. Thus, evaluated designs 360 include sufficient information for design engine 218 to generate a subsequent generation of candidate designs 330 for a building based on the performance of the currently evaluated generation of candidate designs 330.

In some embodiments, evaluation module 326 is configured to remove one or more trimmed building designs 350 from further consideration and exclude such trimmed building designs 350 from evaluated designs 360. For example, evaluation module 326 may be configured to eliminate trimmed building designs 350 that fail to satisfy certain threshold requirements, such as design or site constraints and/or other requirements. Thus, in such embodiments, trimmed building designs 350 that do not fit within a specified building site or satisfy some other minimum requirement for the building are not included in evaluated designs 360.

In some embodiments, final output designs 370 include each trimmed building design 350 that satisfies certain performance criteria for the building. In such embodiments, final output designs 370 may further include the computed values for the performance metrics for each trimmed building design 350 that satisfies certain performance criteria for the building. Thus, final output designs 370 include sufficient information for a designer to select a particular final output design 370 based on the quantified relative performance of output designs 370. Specifically, the information included in final output designs 370 indicates how well or whether a particular building design satisfies one or more design goals.

Figure 5:
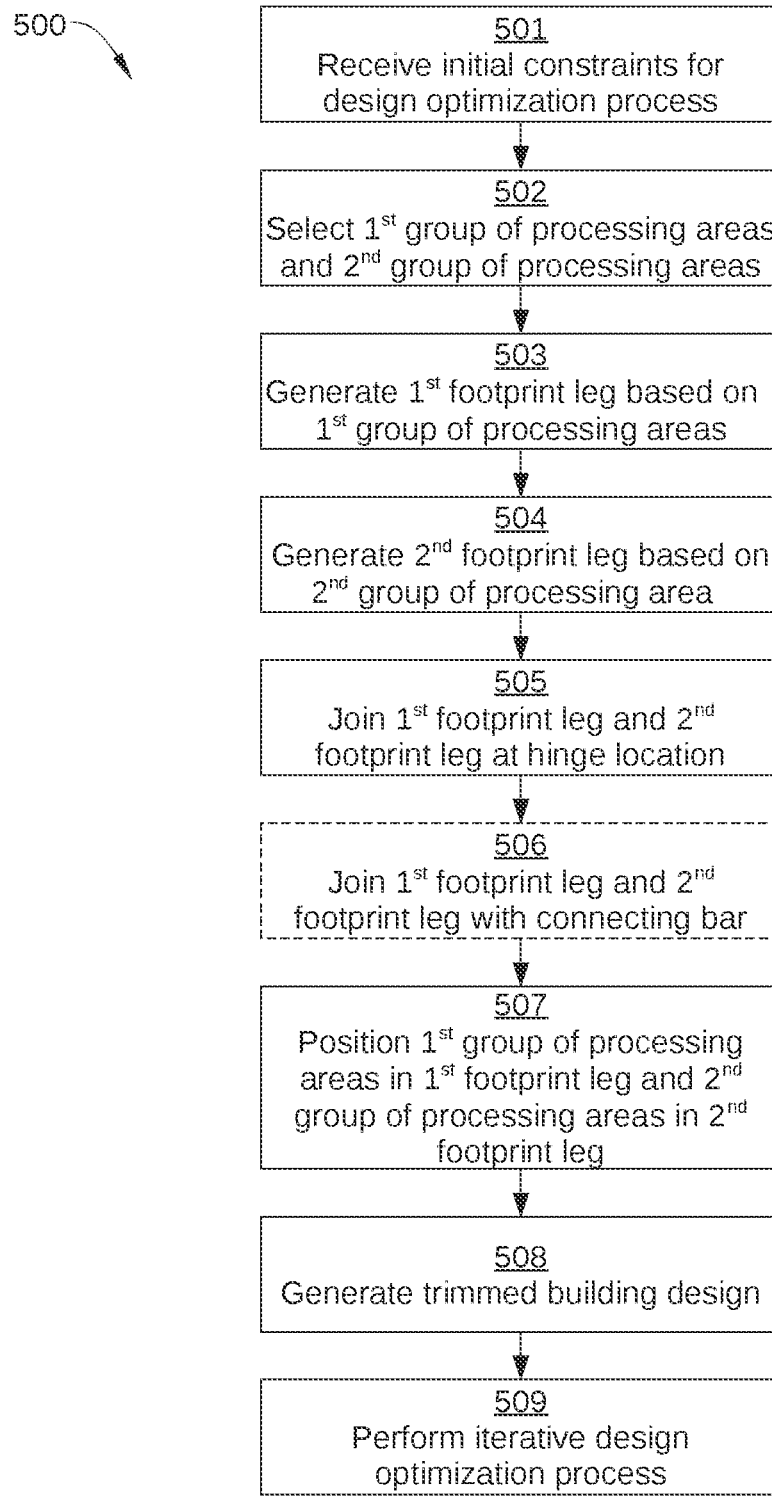
FIG. 5 is a flowchart of method steps for generating an optimized building design for a building site having a complex shape, according to various embodiments.

FIG. 5 sets forth a flowchart of method steps for generating an optimized building design for a building site having a complex shape, according to various embodiments. Although the method steps are described in conjunction with the systems of FIGS. 1-4, persons skilled in the art will understand that any system configured to perform the method steps, in any order, is within the scope of the embodiments As shown, a method 500 begins at step 501, where design engine 218 determines initial constraints 101 for a building design associated with a building site having a complex shape. Initial constraints 101 may include building site constraints, building requirements, and/or performance metrics for evaluating generated building designs.

In step 502, design engine 218 selects a first group of processing areas and a second group of processing areas from the plurality of workstations, workspaces, and/or application-specific processing areas of the building. In some embodiments, design engine 218 selects the first group of processing areas and the second group of processing areas based on workspace data 312 and/or operation data 310. In some embodiments, design engine 218 determines the first group and/or the second group of processing areas based at least in part on which processing areas of the building are related processing areas. In such embodiments, the related processing areas are more likely to benefit from being located in the same portion of the building.

In step 503, as part of generating a particular candidate building design 330, design engine 218 generates a first building footprint leg based on the first group of processing areas, for example as illustrated in FIG. 4 by first building footprint leg 421. In some embodiments, the first building footprint leg is rectangular. In some embodiments, design engine 218 determines an area of the first building footprint leg to be an area that accommodates the area of the first group of processing areas and the access areas associated therewith. In such embodiments, a length and a width of the first building footprint leg may be selected by design engine 218 based at least in part on the determined area of the first building footprint leg.

In some embodiments, design engine 218 determines the values for the length and the width of the first building footprint leg of the particular candidate building design 330 based at least in part on the values selected for the length and the width of the first building footprint leg for other candidate building designs 300 in the same generation. Thus, in such embodiments, values for the geometric parameters of building footprint leg length and building footprint leg width can be varied across the different candidate building designs 330 of the current generation, which enables a more thorough exploration of the design space for those geometric parameters during design optimization process 100.

In step 504, design engine 218 generates a second building footprint leg based on the second group of processing areas, for example as illustrated in FIG. 4 by second building footprint leg 422. In some embodiments, the second building footprint leg is rectangular. In some embodiments, design engine 218 determines an area of the second building footprint leg to be an area that accommodates the area of the second group of processing areas and the access areas associated therewith. In such embodiments, a length and a width of the second building footprint leg may be selected by design engine 218 based at least in part on the determined area of the second building footprint leg.

As with first building footprint leg in step 503, in some embodiments, design engine 218 determines the values for the length and the width of the second building footprint leg of the particular candidate building design 330 based at least in part on the values selected for the length and the width of the second building footprint leg for other candidate building designs 300 in the same generation.

In step 505, design engine 218 joins the first building footprint leg and the second building footprint leg at a pivot location, for example as illustrated in FIG. 4 by pivot location 423. In some embodiments, design engine 218 determines the values for one or more geometric parameters associated with the pivot location based at least in part on the values selected for the pivot location for other candidate building designs 300 in the same generation. Thus, in such embodiments, values for the geometric parameters associated with the pivot location can be varied across the different candidate building designs 330 of the current generation, which enables a more thorough exploration of the design space for those geometric parameters during design optimization process 100. Examples of geometric parameters associated with the pivot location are illustrated in FIG. 4 by position 439 along length 432 at which an edge of first building footprint leg 421 is joined to an edge of second building footprint leg 422 and position 440 along length 431 at which an edge of second building footprint leg 422 is joined to and edge of first building footprint leg 421.

In optional step 506, design engine 218 joins the first building footprint leg and the second building footprint leg with a building footprint connecting bar, for example as illustrated by building footprint connecting bar 428 in FIG. 4. In some embodiments, design engine 218 determines the values for one or more geometric parameters associated with the building footprint connecting bar based at least in part on the values selected for the pivot location for other candidate building designs 300 in the same generation. Thus, in such embodiments, values for the geometric parameters associated with the pivot location can be varied across the different candidate building designs 330 of the current generation, which enables a more thorough exploration of the design space for those geometric parameters during design optimization process 100. Examples of geometric parameters associated with the pivot location are illustrated in FIG. 4 by position 439 along length 432 at which an edge of first building footprint leg 421 is joined to an edge of second building footprint leg 422 and position 440 along length 431 at which an edge of second building footprint leg 422 is joined to and edge of first building footprint leg 421.

In step 507, design engine 218 generates, for example via layout generator 324, a station layout 340 for a candidate building design 330. In some embodiments, design engine 218 positions the first group of processing areas selected in step 502 within the first building footprint leg and the second group of processing areas selected in step 502 within the second building footprint leg. As noted above, design engine 218 performs one or more numerical computer simulations of a candidate building design 330 to generate the station layout 340. One embodiment of station layout 340 is described below in conjunction with FIG. 6.

Figure 6:
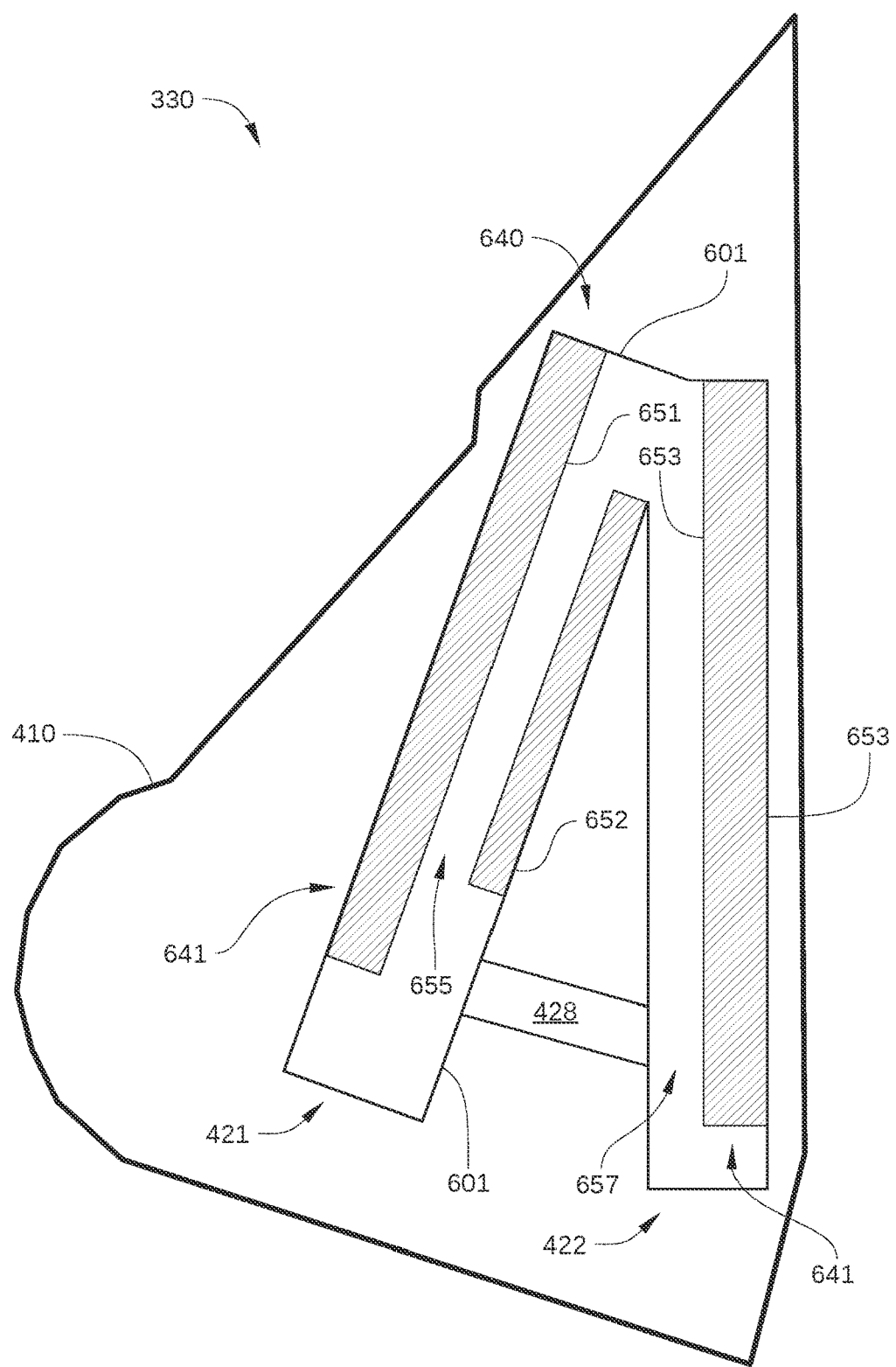
FIG. 6 illustrates a candidate building design populated with a specific station layout generated by the design engine of FIG. 2, according to various embodiments.

FIG. 6 illustrates a candidate building design 330 populated with a specific station layout 640 generated by design engine 218, according to various embodiments. Station layout 640 is generated by design engine 218, for example via layout generator 324, and indicates the positions of the various processing areas 641 (cross-hatched) associated with a particular candidate building design 330. As shown, processing areas 641 are disposed within a footprint 601 of the candidate building design 330. In the embodiment illustrated in FIG. 6, a first portion 651 and a second portion 652 of the processing areas 641 disposed in first building footprint leg 421 are separated by an aisle 655 to enable a process circulation type associated with the processing areas 641 disposed in first building footprint leg 421. Thus, in the embodiment, first portion 651 and second portion 652 of the processing areas 641 are each configured as parallel columns of processing areas. By contrast, a third portion 653 of the processing areas 641 is disposed in second building footprint leg 422, and are all adjacent to a single side 656 of an aisle 657 to enable a process circulation type associated with the processing areas 641 disposed in second building footprint leg 422. Thus, in the embodiment, third portion 653 of the processing areas 641 is configured as a single column of processing areas. In other embodiments, processing areas 641 can be arranged in any other suitable configuration to facilitate a process circulation type associated with processes performed in first building footprint leg 421 and/or in second building footprint leg 422. Examples of candidate building designs with other station layouts are described below in conjunction with FIG. 7.

Figure 7:
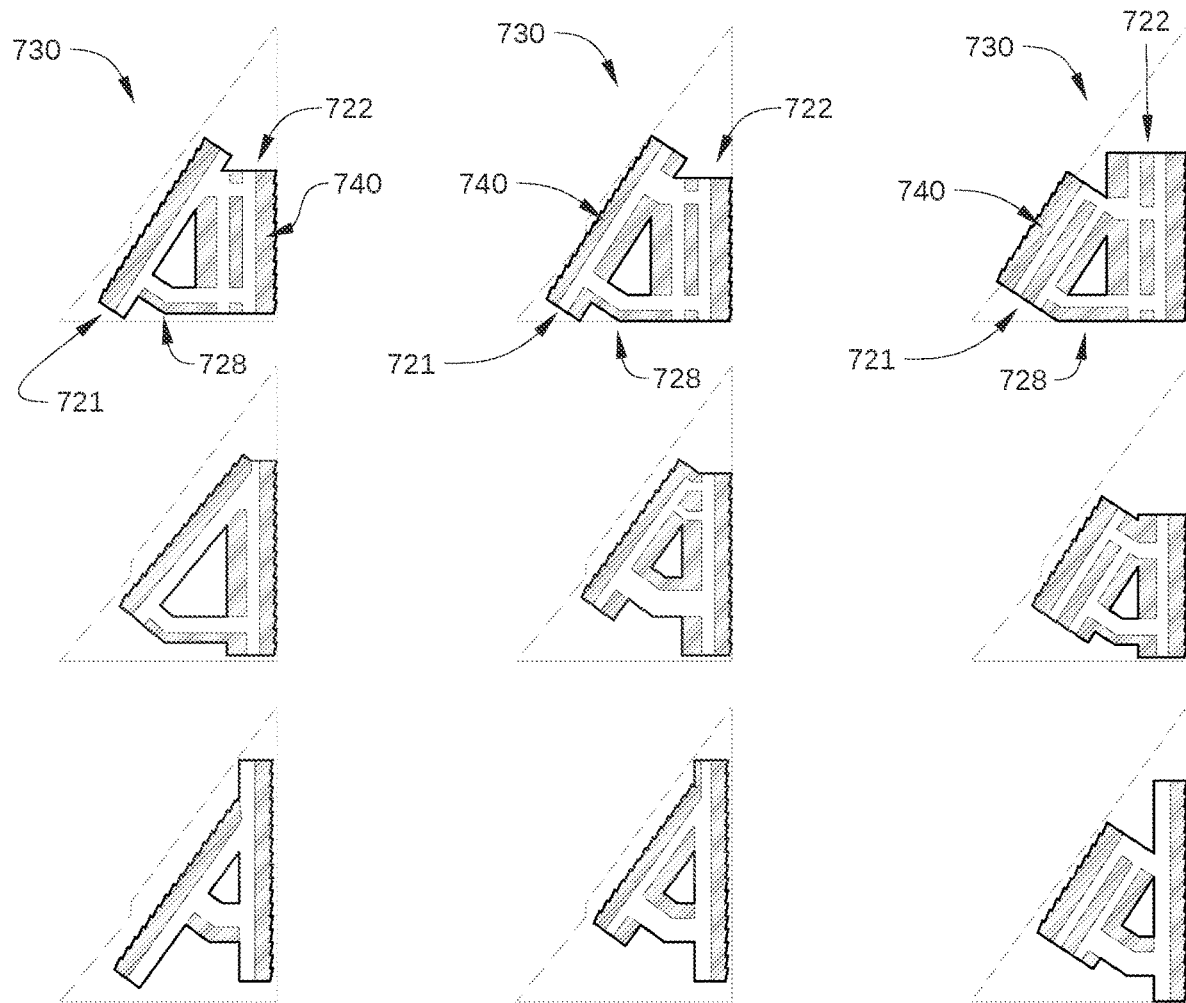
FIG. 7 illustrates a spectrum of candidate building designs generated by the design engine of FIG. 2, according to various embodiments.

FIG. 7 illustrates a spectrum of candidate building designs 730 generated by design engine 218, according to various embodiments. In the embodiment illustrated in FIG. 7, each of designs 730 includes a first building footprint leg 721, a second building footprint leg 722, and a building footprint connecting bar 728. In addition, each candidate building design 730 is configured with a different station layout 740 (cross-hatched areas) generated by design engine 218. As shown, each station layout 740 can be a unique configuration of processing areas, even though each station layout 740 includes the same discrete processing areas.

Returning to FIG. 5, in step 508, design engine 218 generates, for example via trimming module 326, a trimmed building design 350 for the station layout 340. A trimmed building design 350 is generated by the removal of one or more regions of excess space within the corresponding station layout 340. In some embodiments, design engine 218 generates a trimmed building design 350 by performing one or more of the following trimming operations: identifying one or more regions of excess space in the station layout 340, determining which regions of excess space are adjacent to a footprint boundary of the station layout 330, and removing the regions of excess space adjacent to the footprint boundary by modifying the footprint boundary. One example of a trimmed building design 350 being generated is described below in conjunction with FIGS. 8A and 8B.

Figure 8A:
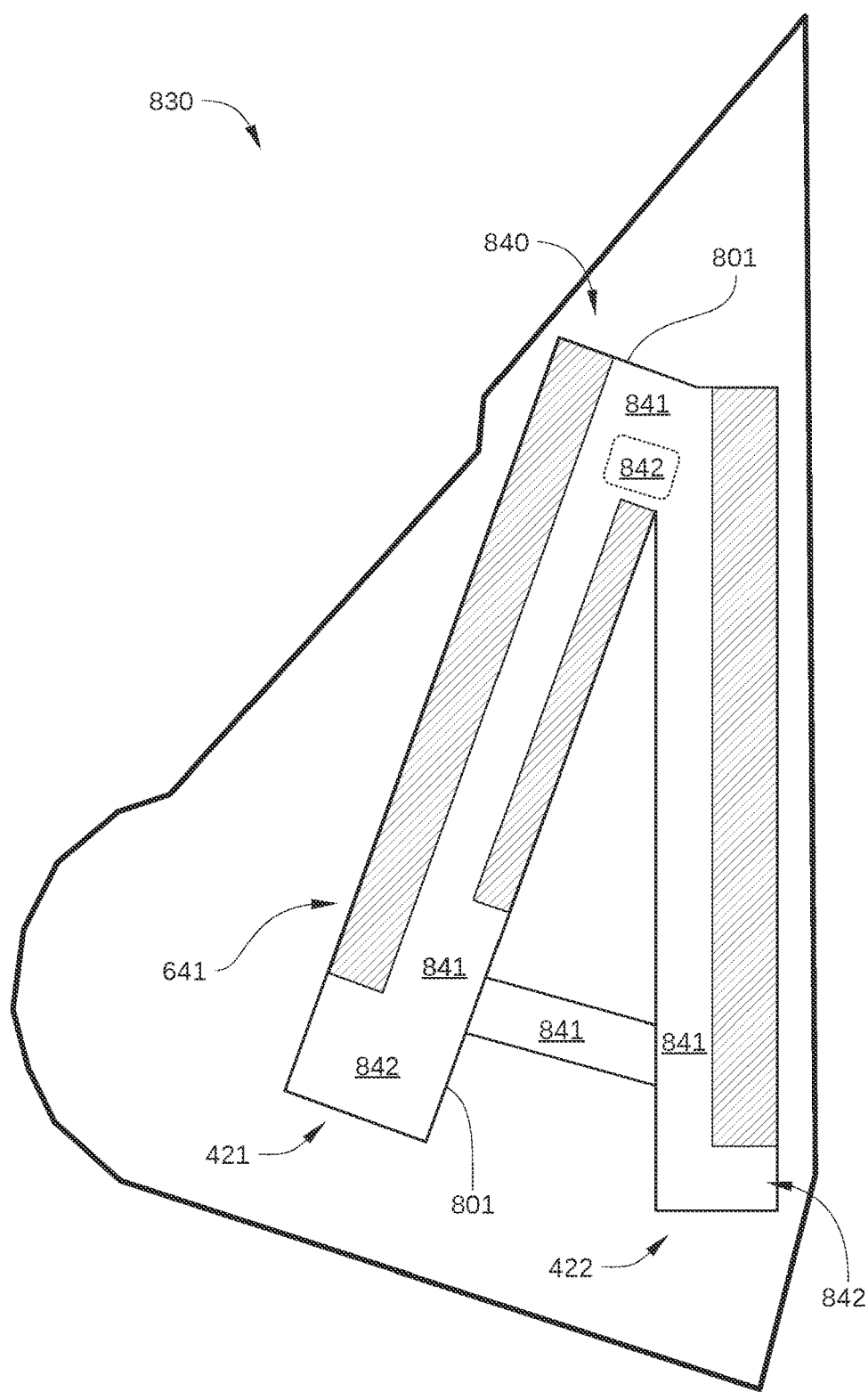
FIG. 8A illustrates a candidate building design populated with an untrimmed station layout, according to various embodiments.

FIG. 8A illustrates a candidate building design 830 populated with an untrimmed station layout 840, according to various embodiments. As shown, untrimmed station layout 840 includes processing stations (hatched areas) and open areas 841, such as aisles or corridors. Based on operation data 310 and/or other operational information associated with the candidate building design 830, design engine 218 determines that certain portions 842 of open areas 841 exceed requirements for candidate building design 830. That is, portions 842 are determined to be excess space that is not required for facilitating operations and/or processes performed in candidate building design 830.

Figure 8B:
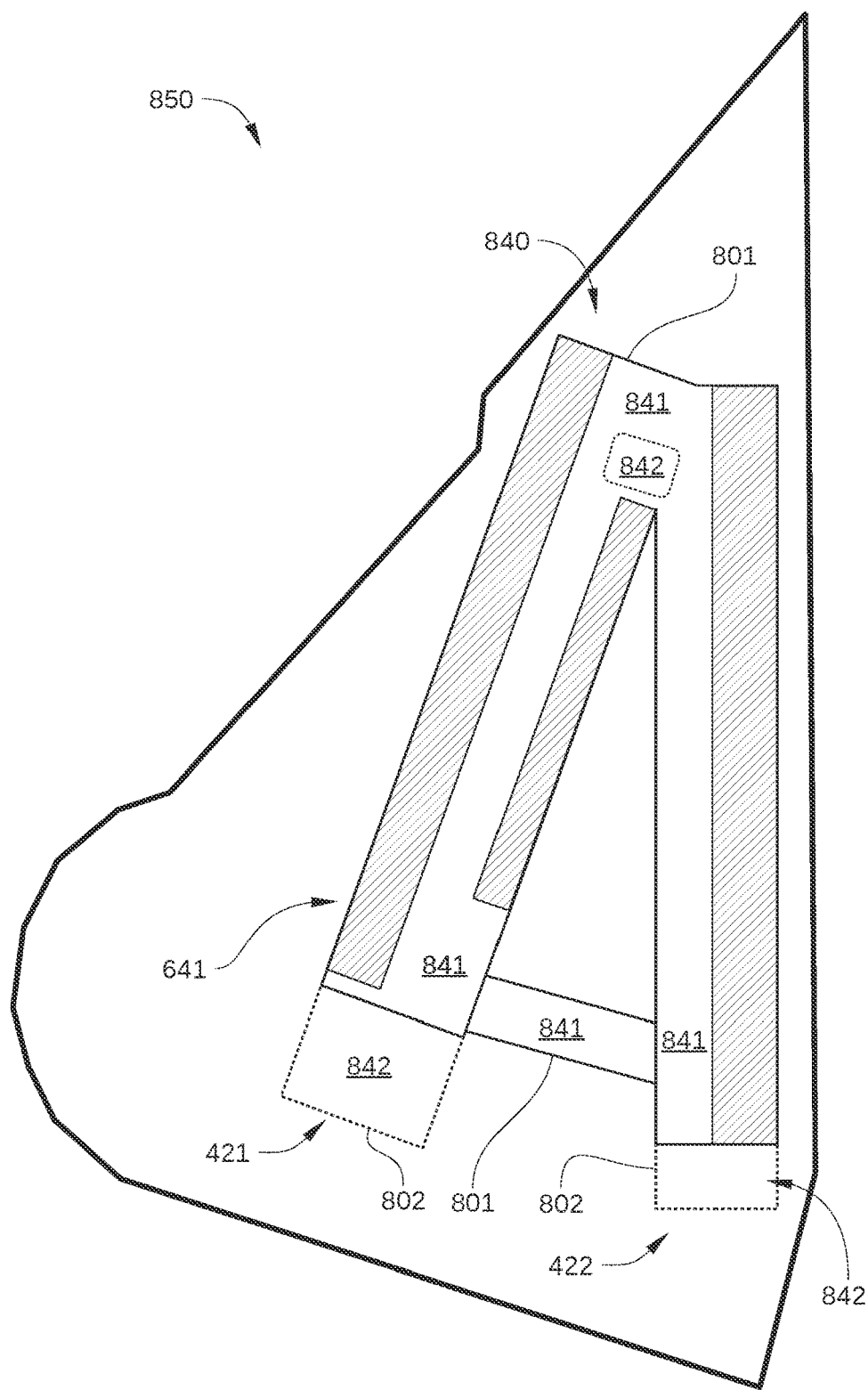
FIG. 8B illustrates a trimmed building design, according to various embodiments.

FIG. 8B illustrates a trimmed building design 850, according to various embodiments. Trimmed building design 850 is generated by design engine 218 from candidate building design 830 and untrimmed station layout 840, for example by performing one or more of the above-described trimming operations via trimming module 326. Thus, trimmed building design 850 is substantially similar to candidate building design 830 when populated with untrimmed station layout 840, except that one or more of portions 842 of open areas 841 have been removed. Specifically, portions 842 that are adjacent to a footprint boundary, such as footprint 801, are removed from candidate building design 830 and footprint 801 is relocated accordingly. For reference, a previous location 802 of footprint 801 is indicated as a dashed line in FIG. 8B.

Returning to FIG. 5, it is noted that steps 502-508 can be repeated for each instance of candidate building design 330 included in a generation of building designs. Thus, in an embodiment in which a generation includes 50 candidate building designs, step 502-508 are performed 50 times, so that 50 different candidate building designs 330 are generated prior to step 509.

In step 509, design engine 218 performs an iterative design optimization process, such as design optimization process 100 of FIG. 1, to generate one or more candidate building designs and provide such building designs to a designer or other user. One embodiment of such a process is described below in conjunction with FIG. 9.

Figure 9:
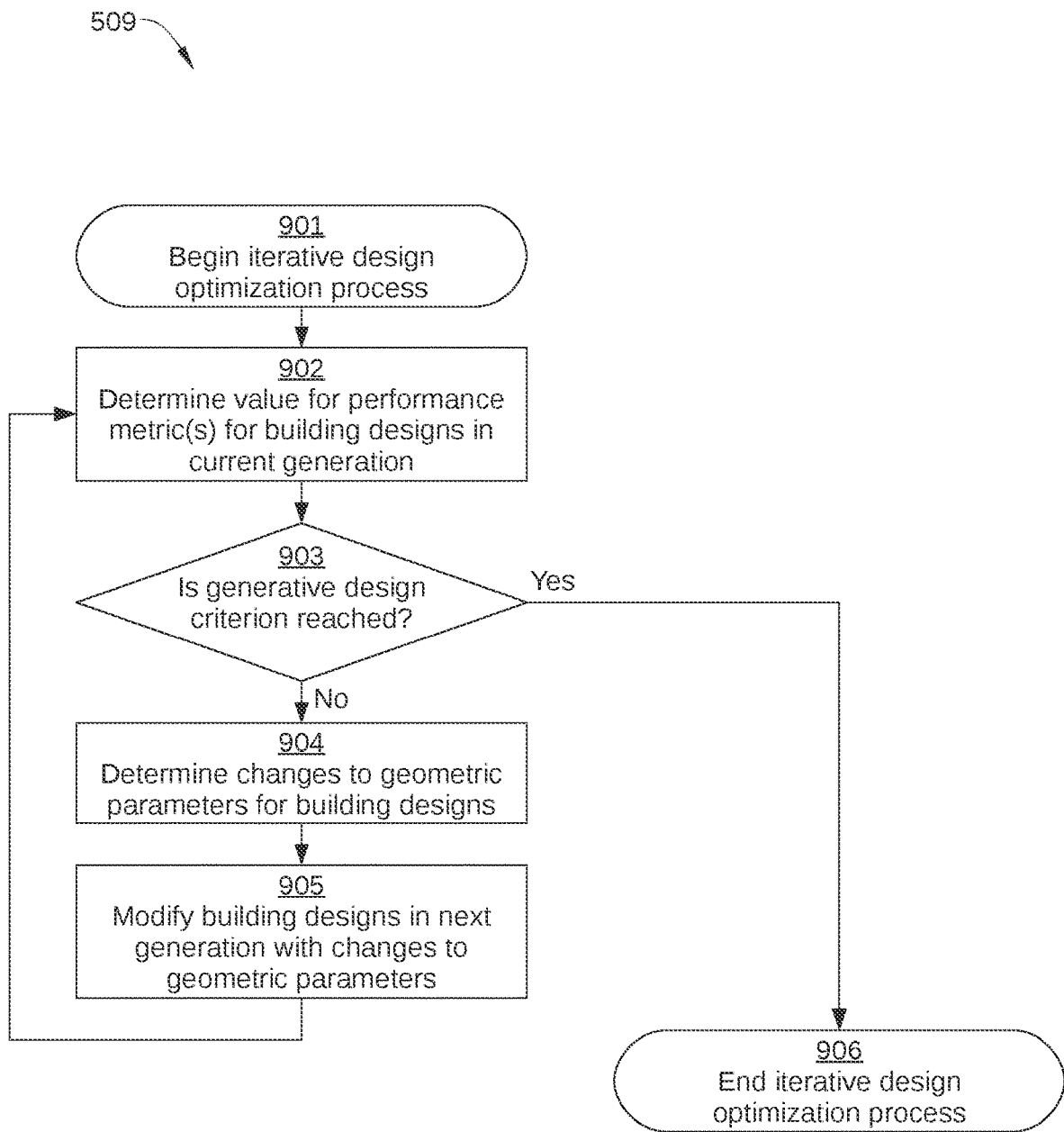
FIG. 9 sets forth a flowchart of method steps for computationally generating a building design for a building site having a complex shape, according to various embodiments.

FIG. 9 sets forth a flowchart of method steps for computationally generating a building design for a building site having a complex shape, according to various embodiments. Although the method steps are described in conjunction with the systems of FIGS. 1-8B, persons skilled in the art will understand that any system configured to perform the method steps, in any order, is within the scope of the embodiments As shown, a method 900 begins at step 901, where design engine 218 begins an iterative design optimization process based on one or more candidate building designs 330 generated by method 500 of FIG. 5. In some embodiments, the one or more candidate building designs include a generation of building designs that each have varying values for certain geometric parameters of the building design. In such embodiments, a more thorough exploration of a design space by design engine 218 is facilitated. In some embodiments, the one or more candidate building designs include trimmed building designs 350.

In step 902, design engine 218 determines, for example via evaluation module 328, a value for each performance metric for each building design in the current generation of candidate building designs 330. For example, in some embodiments, for each candidate building design 330 (and/or trimmed building design 350) in the current generation, design engine 218 determines a value for construction cost of the building, workflow efficiency for processes within the building, a factor indicating suitability for future expansion and/or transformation of the building, sustainability certification level of the building, a factor indicating quality of employee working conditions, a factor indicating ventilation efficiency of the building, energy consumption of the building, and/or the like.

In step 903, design engine 218, determines whether a generative design criterion has been satisfied. Examples of suitable generative design criteria include a maximum number of iterations of steps 902-905 to be performed, a predetermined number of total candidate building designs 330 (and/or trimmed building designs 350) to be evaluated, a predetermined number of candidate building designs 330 (and/or trimmed building designs 350) having a value for one or more ventilation performance metrics that exceed a specific threshold, and the like.

When design engine 218 determines that a predetermined generative design criterion has been satisfied, method 900 proceeds to step 906 and ends. When design engine 218 determines that a predetermined generative design criterion has not been satisfied, method 900 proceeds to step 904.

In step 904, design engine 218, for example via design generator 320, determines changes to geometric parameters for each candidate building design 330 (and/or trimmed building design 350) in the current generation. To generate candidate building designs that are optimized relative to the current generation of candidate building designs 330, design engine 218 determines the changes to the geometric parameters based on the current generation of candidate building designs 330 and on the values of the performance metrics determined in step 902. In some embodiments, the geometric parameters for which changes are determined include dimensions of building portions, a shape of building portions; a location of an intersection point between building portions, an aperture angle between joined building portions; parameters indicating placement and/or orientation of the candidate building design on a building site, and/or the like.

In some embodiments, a value for a single geometric parameter is changed for each candidate building design 330 (and/or trimmed building design 350) in the current generation. In some embodiments, a value for multiple geometric parameters is changed for each candidate building design 330 (and/or trimmed building design 350) in the current generation. In some embodiments, a value for all geometric parameters is changed for each candidate building design 330 (and/or trimmed building design 350) in the current generation.

In step 905, design engine 218 modifies, for example via design generator 320, each candidate building design 330 (and/or trimmed building design 350) in the current generation with the changes determined in step 904.

In step 906, design engine 218 ends the iterative design process.

In performing method 900, design engine 218 may perform any number of different iterations until a collection of building designs are generated that meet one or more design goals, that meet a threshold number of the one or more design goals, or meet each of the one or more design goals to a threshold degree. In some embodiments, after the collection of building designs is generated, design engine 218 may generate an interactive graphical user interface (GUI) that depicts evaluation results, metrics, and/or visualizations corresponding to each building design of the collection of building designs, and display the GUI to the user. Additionally, the GUI may depict one or more of a visualization of a candidate building design 330, a visualization of a building layout 340, values for performance metrics, evaluated designs 360, and/or final output designs 370. Thus, design engine 218 renders simulation and design optimization results for display to a designer or other user via the GUI. Further, the designer can interact with and/or modify the resulting design via the GUI and cause another design optimization process to be performed by design engine 218 to generate further designs, which are then rendered and displayed to the designer. In such embodiments, an designer or other user can quickly view and compare metrics and evaluation results across several potential building designs generated by design engine 218. Additionally, the GUI may include tools for searching, filtering, and/or sorting the plurality of building designs. For example, a user may interact with the GUI to identify building designs that satisfy a particular design criteria.

In sum, a computer aided design (CAD) software application is configured to receive a set of site constraints and generate one or more building designs based on the set of site constraints. Each building design may indicate a size and shape of the footprint of the building. Additionally, each building design may indicate an orientation and location of the building within the site. Based on the site constraints, the CAD software application generates a first rectangular portion of the building footprint and a second rectangular portion of the building footprint. The first rectangular portion and the second rectangular portion may intersect at a pivot location. The computer system generates a plurality of initial building designs based on the first rectangular portion and the second rectangular portion. Generating the plurality of initial building designs includes adjusting one or more geometric parameters for each initial building design, such as the length of each rectangular portion; the width of each rectangular portion; the location of the pivot point on each rectangular portion; or the angle between the two rectangular portions.

At least one technical advantage of the disclosed techniques relative to the prior art is that the disclosed techniques can be incorporated into a CAD application to enable the CAD application to automatically explore a design space to identify regions where the efficient use of a "complex" building site shape is optimized against overall building performance. Accordingly, with the disclosed techniques, a CAD application can generate, for example, a building footprint with an interior layout that is optimized to efficiently utilize a building site having a "complex" shape. This functionality, which is not available in conventional CAD applications, increases the likelihood that appropriately optimized building footprints and associated interior layouts can be automatically generated and identified for any given building site shape. These technical advantages represent one or more tangible and meaningful technological improvements over conventional CAD applications.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a building design for a building site having a complex shape, the method comprising:
   generating a first group of processing areas from a plurality of processing areas associated with the building design and a second group of processing areas from the plurality of processing areas;
   generating a first building footprint leg representing a first portion of a building within the building site that is sized to include the first group of processing areas and a second building footprint leg representing a second portion of the building that is sized to include the second group of processing areas;
   at a pivot location, joining the first building footprint leg and the second building footprint leg at an aperture angle;
   performing a numerical simulation via a first algorithm to determine a first plurality of positions for the first group of processing areas within the first building footprint leg and a second plurality of positions for the second group of processing areas within the second building footprint leg to generate a first candidate building design for the building site, wherein the first candidate building design is associated with a plurality of geometric parameters;
   rendering, for display via a graphical user interface (GUI), the first candidate building design and one or more other candidate building designs;
   receiving a first input via the GUI that modifies at least one of the plurality of geometric parameters for the first candidate building design; and
   performing a plurality of operations to generate a plurality of new candidate building designs by iteratively modifying each geometric parameter included in the plurality of geometric parameters subsequent to receiving the first input.

2. The computer-implemented method of claim 1, further comprising performing a numerical simulation on the first candidate building design to measure at least one performance metric of the first candidate building design.

3. The computer-implemented method of claim 2, further comprising, based on the at least one performance metric, modifying at least one geometric parameter of the plurality of geometric parameters associated with the building associated with the first candidate building design to generate an updated candidate building design.

4. The computer-implemented method of claim 3, wherein the at least one geometric parameter includes at least one of the aperture angle, a width of the first building footprint leg, a length of the first building footprint leg, a width of the second building footprint leg, or a length of the second building footprint leg.

5. The computer-implemented method of claim 3, wherein the at least one geometric parameter includes at least one of a position along the length of the first building footprint leg at which the pivot location is disposed, a position along the length of the second building footprint leg at which the pivot location is disposed, a width of a building footprint connecting bar that is joined to the first building footprint leg and the second building footprint leg, a position along the length of the first building footprint leg at which the building footprint connecting bar is joined to the first building footprint leg, or a position along the length of the second building footprint leg at which the building footprint connecting bar is joined to the second building footprint leg.

6. The computer-implemented method of claim 2, wherein the at least one performance metric includes at least one of a construction cost for the first candidate building design, a suitability for future expansion of the first candidate building design, or a workflow efficiency for processes within the first candidate building design.

7. The computer-implemented method of claim 2, wherein the at least one performance metric includes at least one of a sustainability certification level for the first candidate building design, a suitability for future transformation of the first candidate building design, a quality of employee working conditions for the first candidate building design, or a ventilation efficiency of the first candidate building design.

8. The computer-implemented method of claim 1, further comprising:
   performing a numerical simulation on the first candidate building design to measure at least one performance metric of the first candidate building design; and
   based on the at least one performance metric, generating a plurality of new candidate building designs, wherein each new candidate building design is generated with a different combination of geometric parameter modifications.

9. The computer-implemented method of claim 1, further comprising joining a building footprint connecting bar to the first building footprint leg and the second building footprint leg via a design generator of a computer-aided design software application.

10. The computer-implemented method of claim 1, wherein the aperture angle is ninety degrees or less.

11. One or more non-transitory computer readable storage media storing instructions that, when executed by one or more processors, cause the one or more processors to perform the steps of:

generating a first group of processing areas from a plurality of processing areas associated with the building design and a second group of processing areas from the plurality of processing areas;
generating a first building footprint leg representing a first portion of a building within the building site that is sized to include the first group of processing areas and a second building footprint leg representing a second portion of the building that is sized to include the second group of processing areas;
at a pivot location, joining the first building footprint leg and the second building footprint leg at an aperture angle;
performing a numerical simulation via a first algorithm to determine a first plurality of positions for the first group of processing areas within the first building footprint leg and a second plurality of positions for the second group of processing areas within the second building footprint leg to generate a first candidate building design for the building site, wherein the first candidate building design is associated with a plurality of geometric parameters;
rendering, for display via a graphical user interface (GUI), the first candidate building design and one or more other candidate building designs;
receiving a first input via the GUI that modifies at least one of the plurality of geometric parameters for the first candidate building design; and
performing a plurality of operations to generate a plurality of new candidate building designs by iteratively modifying each geometric parameter included in the plurality of geometric parameters subsequent to receiving the first input.

12. The one or more non-transitory computer readable storage media of claim 11, wherein generating the first group of processing areas from the plurality of processing areas comprises determining related processing areas from the plurality of processing areas based on operation data associated with the building design.

13. The one or more non-transitory computer readable storage media of claim 11, further storing instructions that, when executed by one or more processors, cause the one or more processors to perform the steps of:
based on a result of the numerical simulation, determine a region of excess space that is adjacent to a footprint boundary of the first candidate building design; and
removing the region of excess space from the first candidate building design by modifying the footprint boundary.

14. The one or more non-transitory computer readable storage media of claim 11, wherein the numerical simulation comprises a packing algorithm included in a computer-aided design software application.

15. The one or more non-transitory computer readable storage media of claim 11, further comprising performing a numerical simulation on the first candidate building design to measure at least one performance metric of the first candidate building design.

16. The one or more non-transitory computer readable storage media of claim 15, further comprising, based on the at least one performance metric, modifying at least one geometric parameter of the plurality of geometric parameters associated with the building associated with the first candidate building design to generate an updated candidate building design.

17. The one or more non-transitory computer readable storage media of claim 16, wherein the at least one geometric parameter includes at least one of the aperture angle, a width of the first building footprint leg, a length of the first building footprint leg, a width of the second building footprint leg, or a length of the second building footprint leg.

18. The one or more non-transitory computer readable storage media of claim 16, wherein the at least one geometric parameter includes at least one of a position along the length of the first building footprint leg at which the pivot location is disposed, a position along the length of the second building footprint leg at which the pivot location is disposed, a width of a building footprint connecting bar that is joined to the first building footprint leg and the second building footprint leg, a position along the length of the first building footprint leg at which the building footprint connecting bar is joined to the first building footprint leg, or a position along the length of the second building footprint leg at which the building footprint connecting bar is joined to the second building footprint leg.

19. The one or more non-transitory computer readable storage media of claim 15, wherein the at least one performance metric includes at least one of a construction cost for the first candidate building design, a suitability for future expansion of the first candidate building design, or a workflow efficiency for processes within the first candidate building design.

20. A computer system, comprising:
a memory; and
a one or more processors configured to:
generate a first group of processing areas from a plurality of processing areas associated with the building design and a second group of processing areas from the plurality of processing areas;
generate a first building footprint leg representing a first portion of a building within the building site that is sized to include the first group of processing areas and a second building footprint leg representing a second portion of the building that is sized to include the second group of processing areas;
at a pivot location, join the first building footprint leg and the second building footprint leg at an aperture angle;
perform a numerical simulation via a first algorithm to determine a first plurality of positions for the first group of processing areas within the first building footprint leg and a second plurality of positions for the second group of processing areas within the second building footprint leg to generate a first candidate building design for the building site, wherein the first candidate building design is associated with a plurality of geometric parameters;
render, for display via a graphical user interface (GUI), the first candidate building design and one or more other candidate building designs;
receiving a first input via the GUI that modifies at least one of the plurality of geometric parameters for the first candidate building design; and
performing a plurality of operations to generate a plurality of new candidate building designs by iteratively modifying each geometric parameter included in the plurality of geometric parameters subsequent to receiving the first input.

* * * * *